Patented Aug. 16, 1927.

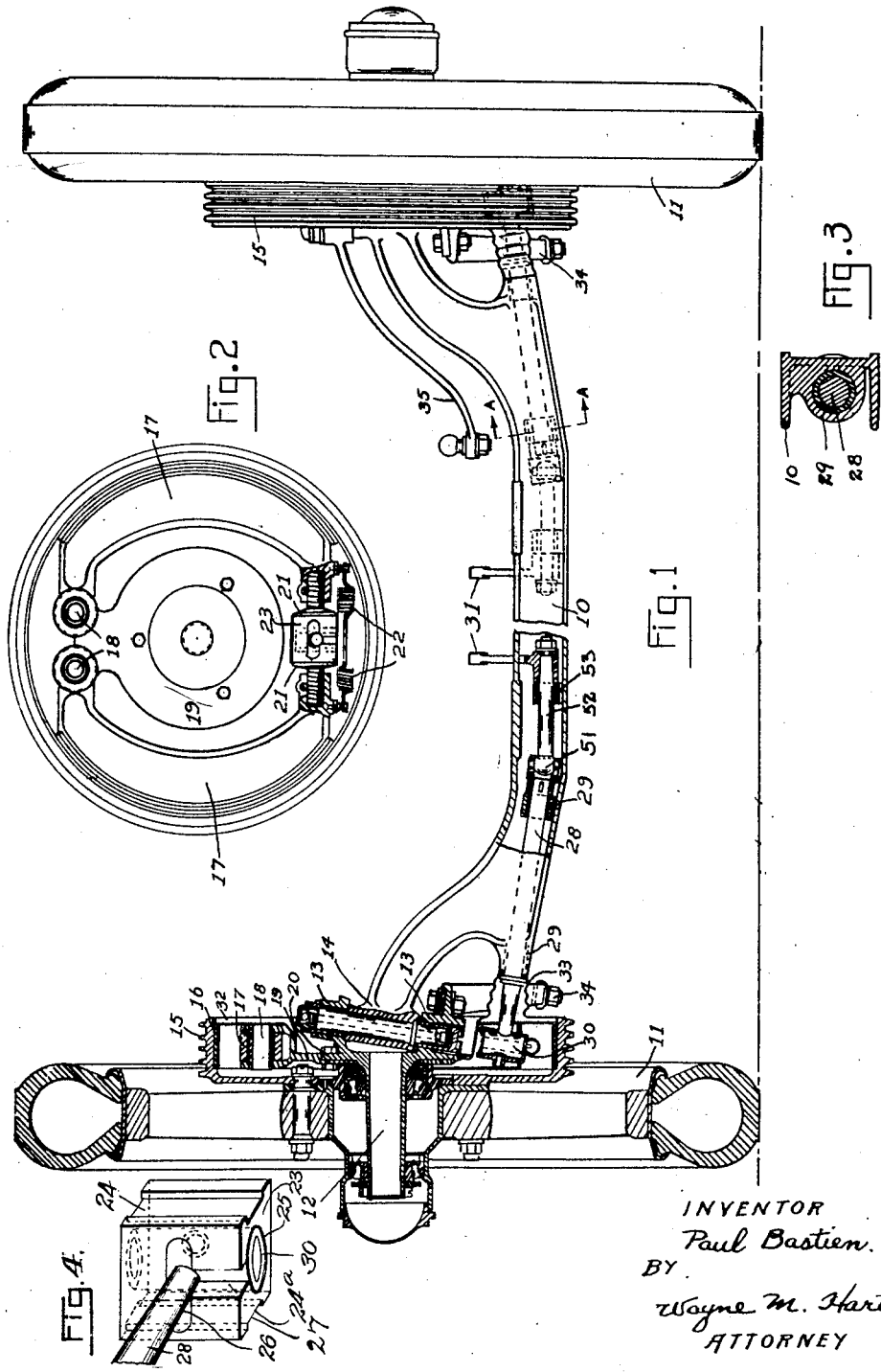

1,639,071

UNITED STATES PATENT OFFICE.

PAUL BASTIEN, OF CLEVELAND, OHIO.

BRAKE-OPERATING MECHANISM.

Application filed August 18, 1922. Serial No. 582,682.

This invention relates to mechanism for applying the brake shoes on the steering wheels of motor vehicles.

An object of my invention resides in the provision of mechanism to operate brakes on the steering wheels of vehicles, certain parts of which are free to oscillate with the wheel and can be rotated at any position of oscillation, to operate the brakes.

Another object of my invention resides in the provision of brake operating means oscillating upon a journal, which journal is in a vertical plane directly below the journal of the wheel.

Another object of my invention is the provision of a spreader for expanding the brake shoes of a brake which spreader is positioned to oscillate freely with the brake shoes and is rotated to expand the brake shoes.

Still another object of my invention resides in the construction details and the combination of parts, whereby a spreader is free to oscillate with a wheel and can be rotated in any position of its oscillation to expand the brake shoes.

In the drawings Figure 1 is a front elevation of a motor vehicle partially broken away illustrating the brake operating mechanism associated therewith; Fig. 2 is a side elevation of the brake shoes and the operating mechanism associated therewith; Fig. 3 is a section through the front axle taken on lines A—A, of Fig. 1; and Fig. 4 is a perspective view of the brake shoe spreader.

In the drawings 10 represents the front axle of a motor vehicle and 11 the front steering wheels which are journaled on the stub axles 12. The stub axles provide at their outer ends, shafts about which the wheels rotate and terminate at their inner ends in two spaced arms 13 which are apertured. The ends 14 of the axle fit between these arms and are provided with an aperture in alignment with those in the arms. Journal pins extend through the apertures in the respective aligned apertures in the axle and arms, allowing the steering wheels to oscillate with respect to the axle. The journals just described, are in an angular relation with respect to the vertical position of the wheels. This structure is well known in the art, and the various details thereof will not be further described, except as it is necessary to fully understand my invention.

As the brake and brake operating mechanism for each front wheel are alike, I have illustrated and will describe only one in detail. A brake drum 15 is secured to the inner side of the steering wheel and is provided with a circular hardened insert, or friction member 16. Two friction members in the form of arcuate brake shoes 17 are located within the drum, adjacent the friction member therein, and are pivoted at their upper ends on pins 18 which extend across and are secured through the flanged ends of a plate 19. This plate is secured to the shoulder 20 extending from the stub axle. The lower ends of the arcuate brake shoes face each other and are each provided with a member 21 secured thereto, having an adjustable bearing face. A spring 22 is secured at opposite ends, to the lower portion of the brake shoes and normally tends to draw these ends together, thereby disengaging the braking surfaces of the shoes from the friction member within the drum.

A substantially square brake shoe spreader or expanding member 23 is positioned between the lower ends of brake shoes so that the bearing faces, of the members 21, bear preferably against opposite flat sides thereof, as shown at 24. Guideways as shown at 24ª in Fig. 4 may be provided in two opposite sides of the spreader just described, said guideways adapted to prevent lateral movement of the adjustable members 21, if desired, and extend vertically the length thereof. The spring 22 retains the members 21 against the sides 24 or within the guideways 24ª. The spreader has a centrally located cylindrical aperture 25 extending therethrough. The inner wall of the spreader is slotted transversely at 26 and a vertical slot 27 extends centrally therefrom to the bottom of the spreader. The spreader 23 is free to oscillate with the brake shoe segments in relation therewith, as just described, and mechanism is provided to rotate the spreader at any position of oscillation, which it may assume, to expand the brake shoes so that they may engage the brake drum.

A shaft 28 is rotatably mounted in bearings 29, forged within the front axle, and extends beyond the end thereof and through the transverse slot 26 in the spreader. This shaft has a cylindrical head 30 formed on the end thereof, which fits within the cylindrical aperture 25 in the spreader and acts as a journal therefor. The wall above the transverse slot in the spreader rests upon the shaft 28 and serves to prevent vertical displacement thereof. The slot 27 is provided in the wall of the spreader so that the spreader can slip down over the shaft 28, when assembling it upon the head 30 and the spreader can oscillate about the head 30 within the limits of the transverse slot 26. The shaft 28 is mounted at an angle with the axle, so that the journal thereon and the spreader will be in alignment with and directly under the angularly disposed journal of the wheel and the shaft 28 extends at a right angle to the journal upon which the wheel oscillates. With this construction the spreader journal head 30 is stationary with respect to the oscillation of the wheel and the spreader is free to oscillate upon its journal within the limits of slot 26 therein, while in its position between the brake shoes and can at the same time be rotated.

A shaft 53 is secured by a universal joint 51 to the end of shaft 28 and is mounted in a bearing 53 within the axle. A lever 31 extends rearwardly from the end of each shaft 52 and is secured thereto. Suitable mechanism is connected to the ends of the levers for rotating the shafts 52, and 28 and the journal heads thereon, which in turn rotate the spreader 23 between the brake shoes. As the spreader rotates the bearing members 21 are forced apart until the brake shoes engage the brake drums sufficiently for the purpose required. The spring 22 draws the brake shoes away from the brake drum when the spreader is rotated to assume its normal position.

A closure plate 32 is secured over the inner face of the brake drum and prevents dirt and foreign matter from entering therein. A boot 33 extends about the shaft 28 between the axle and the closure plate described.

Steering levers 34 are secured to each stub axle and the usual connecting rod, not shown, is secured therebetween. A steering arm 35 of conventional form is operated to oscillate the front wheels for steering.

It is obvious that various changes of detail can be made without departing from the scope and spirit of my invention and I do not limit my invention to the exact details of construction as related herewith.

I claim:—

1. In a brake mechanism, a brake drum, a pair of complementary brake shoes pivoted within said drum at corresponding extremities, the other extremities of said shoes having bearing surfaces, a spreader positioned between and engaging said bearing surfaces, said spreader having a central aperture in one end thereof and a slot in one side thereof extending transversely to said aperture, a head extending into the aperture in said spreader providing a journal therefor, and a rotatable shaft connected to said head and extending through the slot in said spreader, said spreader being free to swivel with said brake shoes and being rotatable with said head to spread said shoes in any position it may assume while swiveling upon said head.

2. In a brake controlling device, the combination of a stationary axle, an oscillating spindle journalled to said axle, a revolvable wheel mounted on said spindle, a brake drum secured to said wheel and brake shoes pivotally supported within said brake drum, with a shaft rotatably mounted in said axle, a revolvable wheel mounted on said spindle, a brake drum secured to said wheel and brake shoes pivotally supported within said brake drum, with a shaft rotatably mounted in said axle, a head on the end of said shaft, a hollow square spreader with guideways on each opposite side positioned with two opposite sides abutting and engaging the free ends of said brake shoes and journalled on said head to rotate therewith and to oscillate thereon, and means for rotating said shaft.

3. In a brake controlling device, the combination of a stationary axle, an oscillating spindle journalled to said axle, a revolvable wheel mounted on said spindle, a brake drum secured to said wheel and brake shoe pivotally supported within said brake drum, said brake shoes having adjustable bearing faces, a shaft rotatably mounted in said axle having a head on end thereof a hollow square brake expander positioned on the shaft head with two opposite sides engaging the adjustable bearing faces of the said brake shoes, said brake expander journalled on said head to rotate therewith and to oscillate thereon and means for rotating said shaft.

4. In a brake operating device the combination of a stationary axle, an oscillating spindle journalled to said axle, a revolvable wheel mounted on said spindle, a brake drum secured to said wheel, brake shoes pivotally supported within said brake drum having adjustable bearing members extending from the free ends thereof, an axle, a shaft mounted to rotate in said axle, a head secured to the outer end of said axle, a brake shoe spreader having vertical slots in the opposite faces thereof to receive the end of the adjustable bearing members to prevent lateral movement thereof, said spreader being rotatably mounted on said shaft and adapted to oscillate thereon, and means for rotating said shaft.

5. In a brake controlling device, the combination of a stationary axle, an oscillating spindle journalled to the said axle and at an angle relative to the axis of rotation of a wheel rotatably mounted on said spindle, a brake drum secured to the wheel, brake shoes supported within the said brake drum, a shaft rotatably mounted in the axle and parallel thereto, a second shaft having a head disposed beneath the spindle and rotatably mounted in the axle and at an angle to the first shaft, means for swivelably connecting the said shafts together, and a brake shoe spreader positioned between the free ends of the brake shoes, said spreader being oscillatable on an axis at right angles to the spindle axis by the shafts to spread the brake shoes into braking engagement with said brake drum.

6. In a brake control device the combination of a stationary axle, said axle being bent at an angle adjacent to its ends to provide an angularly disposed journal, a spindle oscillatably connected to the journal and on an axis at an angle to the axis of rotation of a wheel rotatably mounted on the spindle, a brake drum secured to the wheel, brake shoes supported within the said brake drum, a shaft rotatably mounted on the axis and parallel thereto, a second shaft having a head rotatably mounted in the axle at an angle to the first shaft, means for connecting the said shafts together and a brake shoe spreader positioned between the free ends of the shoes, said spreader being oscillatable by the said shafts on a plane at right angles to the said second shaft and in alignment with the angularly disposed spindle journal to move the brake shoes into braking engagement with said brake drum.

In testimony whereof, I hereunto affix my signature.

PAUL BASTIEN.